(12) United States Patent
Cook (10) Patent No.: US 9,500,518 B2
(45) Date of Patent: Nov. 22, 2016

(54) ADVANCED OPTICS FOR IRST SENSOR HAVING AFOCAL FOREOPTICS POSITIONED BETWEEN A SCANNING COELOSTAT MIRROR AND FOCAL IMAGING OPTICS

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 143 days.

(21) Appl. No.: 14/612,524

(22) Filed: Feb. 3, 2015

(65) Prior Publication Data

US 2016/0223394 A1 Aug. 4, 2016

(51) Int. Cl.
| | |
|---|---|
| *G01J 1/04* | (2006.01) |
| *G01S 17/02* | (2006.01) |
| *G01S 7/481* | (2006.01) |
| *G01S 7/497* | (2006.01) |
| *G02B 27/64* | (2006.01) |
| *G01S 17/42* | (2006.01) |

(52) U.S. Cl.
CPC ............ *G01J 1/0411* (2013.01); *G01S 7/4817* (2013.01); *G01S 7/4972* (2013.01); *G01S 17/023* (2013.01); *G02B 27/644* (2013.01); *G01S 17/42* (2013.01)

(58) Field of Classification Search
CPC ........ G01J 1/04; G02B 23/00; G01S 17/023; G01S 7/497

USPC ............... 250/208.1, 216, 221, 203.1, 203.6, 250/206.1; 356/3.02, 3.03, 18, 19
See application file for complete search history.

(56) References Cited

U.S. PATENT DOCUMENTS

| | | | |
|---|---|---|---|
| 4,804,258 A | 2/1989 | Kebo | |
| 6,902,282 B2 | 6/2005 | Cook | |
| 8,563,929 B2* | 10/2013 | Vizgaitis | G02B 17/0832 250/332 |
| 8,759,735 B2 | 6/2014 | Cook et al. | |

* cited by examiner

*Primary Examiner* — Que T Le
(74) *Attorney, Agent, or Firm* — Lando & Anastasi, LLP (57) ABSTRACT

An optical sensor system having an extended elevation field of view and in which the optics are configured around an all-reflective four-mirror reimaging anastigmat used for afocal foreoptics and an all-reflective five-mirror reimaging anastigmat used for imaging optics. One example of an optical sensor system includes afocal foreoptics configured to receive and collimate electromagnetic radiation, the afocal foreoptics including an all-reflective, reimaging four-mirror anastigmat, an imaging detector, focal imaging optics positioned between the afocal foreoptics and the imaging detector and configured to receive the collimated beam of electromagnetic radiation from the afocal foreoptics and to focus the beam of electromagnetic radiation onto the imaging detector, the focal imaging optics including a reimaging five-mirror anastigmat, wherein a field of view of the system is determined at least in part by a combination of the afocal foreoptics and the focal imaging optics and covers at least 5 degrees in elevation.

17 Claims, 8 Drawing Sheets

| Surf | Function | Rd, in. | CC | Ad(r^4) | Ae(r^6) | Af(r^8) | Ag(r^10) | Yd, in. | Alpha, deg. | Thk, in. | Matl. |
|---|---|---|---|---|---|---|---|---|---|---|---|
| 1 | Celo. | inf. | | | | | | | 45.00 | -11.500 | Refl. |
| 2 | Afoc. Pri. | 17.5258 | -1.05951 | 9.967E-07 | 1.155E-09 | 1.303E-12 | -2.572E-15 | 3.557E-02 | 0.3313 | 6.4909 | Refl. |
| 3 | Afoc. Sec. | 4.7093 | -1.40628 | 1.340E-04 | 1.620E-06 | -5.332E-08 | 6.887E-10 | 9.626E-03 | 1.1337 | -5.1223 | Refl. |
| 4 | dumby | inf. | | | | | | -1.471E-01 | 6.014E-04 | 0.0 | Air |
| 5 | Afoc. Tert. | 15.5423 | -1.80779 | -2.208E-05 | 9.047E-07 | -1.382E-08 | 1.200E-10 | -0.06908 | 0.09144 | 13.9006 | Refl. |
| 6 | Afoc. Quat. | -15.5361 | -1.66043 | 2.215E-05 | 6.861E-07 | 2.796E-09 | -5.413E-11 | -0.13246 | -1.1626 | -7.0327 | Refl. |
| 7 | dumby | inf. | | | | | | -3.0111 | | | |
| 8 | Roll Fold | inf. | | | | | | | 45.00 | 2.700 | Refl. |
| 9 | Taylor | inf. | | | | | | | -24.1207 | 0.4647 | GaAs |
| 10 | Taylor | inf. | | | | | | | 0.4647 | GaAs |
| 11 | Taylor | inf. | | | | | | | 24.1207 | -0.4647 | Refl. |
| 12 | Taylor | inf. | | | | | | | -90.00 | 1.6610 | GaAs |
| 13 | Taylor | inf. | | | | | | | | | Refl. |
| 14 | Taylor | inf. | | | | | | | | -1.6610 | GaAs |
| 15 | Taylor | inf. | | | | | | | 90.00 | -0.4647 | GaAs |
| 16 | Taylor | inf. | | | | | | | -24.1207 | 0.4647 | Refl. |
| 17 | Taylor | inf. | | | | | | | | 0.4647 | GaAs |
| 18 | Taylor | inf. | | | | | | | 24.1207 | 2.500 | Air |
| 19 | dumby | inf. | | | | | | 0.03165 | | 2.750 | Air |
| 20 | BSM | inf. | | | | | | | 45.00 | -7.5180 | Refl. |
| 21 | dumby | inf. | | | | | | -6.8244 | 15.7896 | 1.2155 | Air |
| 22 | Imager Pri. | 13.0425 | -0.18731 | -1.303E-05 | -3.465E-08 | -9.557E-10 | 2.834E-12 | 0.1944 | 0.49138 | 5.4880 | Refl. |
| 23 | Imager Sec. | 6.700 | -0.25680 | -1.504E-03 | 5.051E-05 | -1.928E-06 | 3.763E-08 | 0.4160 | -5.3894 | -5.5011 | Refl. |
| 24 | Imager Tert. | 13.8007 | -2.61838 | 1.107E-04 | 4.303E-06 | 1.784E-07 | -3.159E-09 | 0.4173 | -4.5159 | 5.5023 | Refl. |
| 25 | Imager Quat. | 7.5912 | 2.70584 | -1.305E-04 | 1.646E-05 | -2.798E-06 | 5.404E-08 | -0.01467 | -1.0866 | -5.5043 | Refl. |
| 26 | Imager Quint. | 8.9146 | -0.03194 | 2.508E-05 | 5.972E-07 | -1.648E-08 | 8.803E-10 | -0.00948 | 0.196300 | 6.2453 | Refl. |
| 27 | Dewar Wnd. | inf. | | | | | | -0.9001 | -14.9018 | 0.07755 | ZnSe |
| 28 | Dewar Wnd. | inf. | | | | | | | | 0.07755 | Air |
| 29 | Stop | inf. | | | | | | | -14.9018 | 2.8664 | Air |
| 30 | dumby | inf. | | | | | | -0.9001 | -5.5184 | -0.1197 | Air |
| 31 | Filter | inf. | | | | | | -1.61514 | | 0.0261 | ZnSe |
| 32 | Filter | inf. | | | | | | | | 0.05984 | Air |
| 33 | Image | inf. | | | | | | | | | Air |

*FIG. 4A*

| Surf | Function | Z5 | Z8 | Z10 | Z12 | Z14 | Z17 | Z19 | Z21 |
|---|---|---|---|---|---|---|---|---|---|
| 1 | Celo. | | | | | | | | |
| 2 | Afoc. Pri. | 3.510E-04 | -5.255E-06 | 3.160E-06 | 1.777E-07 | 7.228E-08 | -3.921E-09 | 2.472E-08 | 2.565E-09 |
| 3 | Afoc. Sec. | 4.350E-03 | -3.900E-04 | 1.354E-04 | 8.453E-05 | 1.786E-05 | 5.282E-06 | 2.898E-06 | 1.563E-09 |
| 4 | dumby | | | | | | | | |
| 5 | Afoc. Tert. | 5.890E-04 | -1.352E-04 | 6.751E-06 | 1.942E-05 | 1.515E-06 | 1.362E-06 | -1.513E-07 | -8.877E-08 |
| 6 | Afoc. Quat | 3.729E-04 | 2.628E-04 | -7.823E-06 | -5.436E-06 | 1.598E-07 | 8.643E-06 | -5.136E-07 | 1.829E-08 |

FIG. 4B

Zernike Figure Terms:

| Term | Polar | Cart. | Form |
|---|---|---|---|
| Z5 | r Cos 2theta | $x^2 - y^2$ | astig. |
| Z8 | $r^3$ Sin theta | $y(x^2 + y^2)$ | coma |
| Z10 | $r^3$ Sin 3theta | $y(3x^2 - y^2)$ | clover |
| Z12 | $r^4$ Cos 2theta | $x^4 - y^4$ | astig. |
| Z14 | $r^4$ Cos 4theta | $x^4 - 6 x^2 y^2 + y^4$ | |
| Z17 | $r^5$ Sin theta | $y(x^2 + y^2)^2$ | coma |
| Z19 | $r^5$ Sin 3theta | $3 x^4 y + 2 x^2 y^3 - y^5$ | clover |
| Z21 | $r^5$ Sin 5theta | $5 x^4 y - 10 x^2 y^3 + y^5$ | |

*FIG. 4C*

ADVANCED OPTICS FOR IRST SENSOR HAVING AFOCAL FOREOPTICS POSITIONED BETWEEN A SCANNING COELOSTAT MIRROR AND FOCAL IMAGING OPTICS

BACKGROUND

There are numerous applications for imaging sensors that provide infrared search and track (IRST), targeting or stand-off reconnaissance functions, such as on an aircraft including an unmanned aerial vehicle (UAV) platform for standoff reconnaissance or on a jet aircraft for IRST, targeting (i.e., target location and designation) and standoff reconnaissance (e.g., survey or observation to collect image information). Additionally, some IRST systems include laser range-finding, and/or coherent laser detection and ranging (LADAR) capabilities. As its name indicates, an IRST system operates generally in the infrared wavelength range; however visible and short wave infrared (SWIR) wavelength sensing capability may also be desired within the IRST sensor.

Sensors to be used on aircraft are typically mounted within a pod that is mounted to the aircraft, and as a result are constrained to fit within the volume of the pod. Traditional pod-mounted electro-optic infrared sensors used solely for targeting functions usually have aperture*FOV (field of view) products, for the elevation axis, in the range of about 4-5 inch-degrees. Certain multi-function airborne sensor systems that include IRST capability, such as that disclosed in U.S. Pat. No. 8,759,735, for example, have extended the range of the elevation aperture*FOV product to about 10-12 inch-degrees. Some attempts to further increase the elevation field of view, and therefore the elevation aperture*FOV product, have involved the use of refractive optics; however, these attempts have not enjoyed great success, and severely limit the sensor capabilities due to spectral bandwidth limitations associated with refractive optical elements.

SUMMARY OF INVENTION

Aspects and embodiments relate to optical sensor systems in general and in particular to a multi-function airborne sensor system that includes an IRST function and has an extended elevation field of view. In particular, and as discussed in more detail below, aspects and embodiments are directed to an airborne sensor system in which the optics are configured around an all-reflective four-mirror reimaging anastigmat used for the on-gimbal afocal foreoptics (replacing the folded three-mirror anastigmat conventionally used) and an all-reflective five-mirror reimaging anastigmat used for the off-gimbal imaging optics (replacing the four-mirror anastigmat conventionally used). Such a system may have numerous advantages, as discussed below.

According to one embodiment, an optical sensor system comprises afocal foreoptics configured to receive and collimate electromagnetic radiation to provide a collimated beam of electromagnetic radiation, the afocal foreoptics including an all-reflective, reimaging four-mirror anastigmat, an imaging detector, focal imaging optics positioned between the afocal foreoptics and the imaging detector and configured to receive the collimated beam of electromagnetic radiation from the afocal foreoptics and to focus the beam of electromagnetic radiation onto the imaging detector, the focal imaging optics including a reimaging five-mirror anastigmat, the afocal foreoptics being configured to rotate about a first axis relative to the focal imaging optics and the imaging detector, and a scanning coelostat mirror configured to direct the electromagnetic radiation to the afocal foreoptics and to sweep a field of view of the imaging detector over a field of regard larger than the field of view, the afocal foreoptics being positioned between the scanning coelostat mirror and the focal imaging optics, and the field of view being determined at least in part by a combination of the afocal foreoptics and the focal imaging optics and covering at least 5 degrees in elevation.

Various embodiments may include any one or more of the following features.

In one example, the four-mirror anastigmat of the afocal foreoptics includes a primary mirror configured to receive and reflect the electromagnetic radiation from the coelostat mirror, a secondary mirror configured to receive and reflect the electromagnetic radiation from the primary mirror, a tertiary mirror configured to receive and reflect the electromagnetic radiation from the secondary mirror, the primary, secondary, and tertiary mirrors together constituting an objective that forms an intermediate image, and a quaternary mirror configured to refocus the intermediate image to infinity to produce the collimated beam of electromagnetic radiation, and to reflect the collimated beam of electromagnetic radiation toward the focal imaging optics. In one example, the primary, secondary, tertiary, and quaternary mirrors are non-spherical mirrors. In another example, the primary mirror is a conic ellipsoid mirror, the secondary mirror and the tertiary mirror are conic hyperboloid mirrors, and the quaternary mirror is a conic oblate spheroid mirror. In another example, the primary mirror, the tertiary mirror, and the quaternary mirror each have positive optical power, and the secondary mirror has negative optical power. In one example, optical powers of the primary, secondary, tertiary, and quaternary mirrors are balanced to provide a substantially zero Petzval curvature.

The afocal foreoptics may be configured to directly receive the electromagnetic radiation from the coelostat mirror with there being no reflective optical element positioned in an optical path between the coelostat mirror and the primary mirror. In one example, the afocal foreoptics has an optical magnification of approximately 3.75×.

In another example, the five-mirror anastigmat is configured to form an intermediate image between a second mirror and a third mirror of the five-mirror anastigmat. In one example, a first mirror of the five-mirror anastigmat, the third mirror, and a fifth mirror of the five-mirror anastigmat have positive optical powers, and the second mirror and a fourth mirror of the five-mirror anastigmat have negative optical powers. In one example, the optical powers of the first, second, third, fourth, and fifth mirrors are balanced to produce a substantially zero Petzval curvature at the imaging detector.

According to another embodiment, an optical sensor system comprises a first optical sub-system including an imaging detector and focal imaging optics configured to receive a collimated beam of electromagnetic radiation and to focus the electromagnetic radiation toward the imaging detector, the focal imaging optics including an all-reflective reimaging five-mirror anastigmat, and a second optical sub-system configured to rotate about a first axis relative to the first optical sub-system, the second optical sub-system including afocal foreoptics configured to receive electromagnetic radiation and to direct the collimated beam of the electromagnetic radiation to the first optical sub-system, and a coelostat mirror configured to rotate about a second axis substantially perpendicular to the first axis and to receive and reflect the electromagnetic radiation toward the afocal foreoptics, the afocal foreoptics including an all-reflective, reimaging four-mirror anastigmat.

Various embodiments may include any one or more of the following features.

In one example, the first optical sub-system further includes a derotation device configured to receive the collimated beam of the electromagnetic radiation from the second optical sub-system and to transmit the electromagnetic radiation towards the focal imaging optics, the derotation device being configured to counter-rotate the collimated beam of the electromagnetic radiation so that an image output by the derotation device is in a same direction independent of a rotation of the coelostat mirror about the second axis and about the first axis.

The first optical sub-system may further include a laser module configured to emit a laser beam and an auto-alignment beam, the laser beam being directed towards the coelostat mirror via the afocal foreoptics. In one example, the auto-alignment beam is used to determine a line of sight of the laser beam.

In one example, a combination of the afocal foreoptics and the focal imaging optics provide a field of view for the imaging detector that is at least 5 degrees in elevation.

In another example, the afocal foreoptics is configured to directly receive the electromagnetic radiation from the coelostat mirror with there being no reflective optical element positioned in an optical path between the coelostat mirror and the afocal foreoptics.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to an optical configuration for a multi-function gimbaled airborne sensor system that provides significantly increased field of view (FOV) in elevation, while maintaining all the advantages and capabilities of an all-reflective optical system. As discussed above, conventional IRST (infrared search and track) capable airborne sensor systems have limited FOV in elevation. For example, sensor systems using on-gimbal foreoptics having a folded all-reflective three-mirror anastigmat optical form, such as that disclosed in U.S. Pat. No. 8,759,735, for example, are limited by size, image quality, and distortion constraints to approximately 2.5° FOV in elevation (EL FOV). Although certain approaches using refractive optics have achieved ~3.0° EL FOV, such designs are severely limited in spectral coverage, have low transmission, and suffer from high thermal sensitivity due to the refractive nature of the optics. There is a need for IRST-capable sensor systems having at least 5° EL FOV that are also packagable within the volume constraints associated with existing pod-mounted sensor systems.

As discussed in more detail below, certain aspects and embodiments are directed to a sensor system and associated optics that may achieve >5° EL FOV with a ~5 inch aperture within an ~16 inch diameter roll axis cylinder volume, compatible with existing pod-mounted packaging. In particular, certain embodiments use an on-gimbal all-reflective afocal foreoptics form based on a uniquely packaged version of an afocal four-mirror anastigmat, in combination with an off-gimbal imager having a five-mirror anastigmat optical form, and a single coelostat scanning mirror. Such a system may achieve fast scanning over a wide field of regard in both azimuth and elevation, as discussed further below, while maintaining all the active and passive spectral wavelength options associated with a conventional all-reflective multi-function airborne sensor, along with high transmission and low thermal sensitivity, due to the all-reflective optical design.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
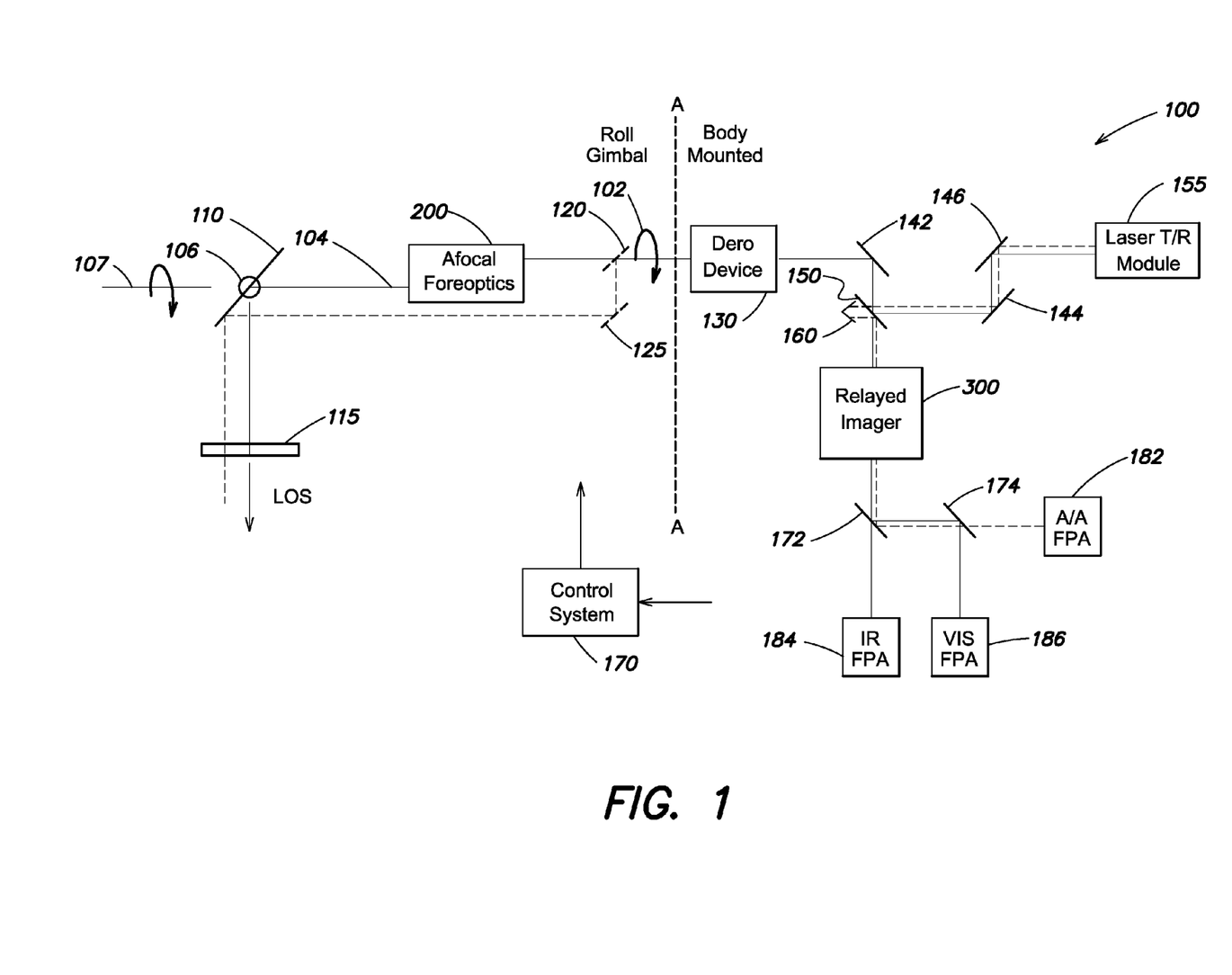
FIG. 1 is a block diagram of one example of a sensor system according to aspects of the present invention.

Referring to FIG. 1 there is illustrated a block diagram of one example of a multi-function optical sensor system capable of providing IRST, standoff reconnaissance, and targeting functions. The sensor system 100 is configured to be mounted to a movable platform, such as an aircraft, for example. Accordingly, the sensor system 100 includes on-gimbal optics (all components to the left of dotted line A-A) which are mounted on a roll gimbal, and off-gimbal, or body-mounted components (all components to the right of dotted line A-A). The on-gimbal components of the sensor system 100 includes afocal foreoptics 200 coupled to a single coelostat mirror 110 (also referred to as a pointing mirror), and one or more external windows 115. The on-gimbal components may also optionally include a wide field of view (WFOV) insert mirror 120 and a by-pass mirror 125, as discussed further below. The roll gimbal rotates about a roll axis, as indicated by arrow 102, that is generally parallel to the beam of electromagnetic radiation 104 transmitted or received by the afocal foreoptics 110. The body-mounted components of the sensor system 100 may include a derotation optical device 130, beam steering mirrors 142, 144, 146, a laser dichroic beam splitting (B/S) element 150, a laser module 155, a beam direction preserving device (e.g., a corner cube or corner cube array) 160 as part of an active-to-passive auto-alignment subsystem, a multi-mirror relayed imager or imaging optics 300, dichroic beam splitters (B/S) 172 and 174, an auto-alignment detector (e.g., a focal plane array) 182, an infrared detector or detectors (e.g., one or more focal plane arrays) 184, and a visible detector (e.g., a charge coupled device or CCD) 186. In one example, the body-mounted components are mounted onto a structure that can be attached to the body of the airborne platform (e.g., an aircraft). The structure may be fixed relative to the body or movable relative to the body.

In an observation mode, such as a standoff reconnaissance mode or IRST mode, electromagnetic radiation from an object at far field is received, via the window(s) 115, by the coelostat mirror 110, which is pointed in a direction of a scene or object being observed, i.e., pointed in a line of sight direction (LOS). The coelostat mirror 110 may be configured to rotate around a rotation axis 106 or 107 or both to scan the field of view of the sensor system over a wider field of regard. The coelostat mirror 120 receives electromagnetic radiation from a scene or object at different elevation and azimuth angles and reflects the received electromagnetic radiation in generally the same direction (direction of the reflected electromagnetic radiation beam 104) towards the afocal foreoptics 200 or by-pass mirror 125.

In one embodiment, the afocal foreoptics 200 comprises an afocal four-mirror anastigmat telescope, as discussed further below. A collimated electromagnetic radiation beam from the object or scene at far field received by the afocal foreoptics 200 is output by the afocal foreoptics as a collimated electromagnetic radiation beam of generally smaller diameter but correspondingly larger field of view. The collimated electromagnetic radiation beam output by the afocal foreoptics 200 may be directed toward the derotation device 130. When the electromagnetic radiation beam passes through the afocal foreoptics 200, a relatively narrow field of view (NFOV) is achieved. In order to achieve a wider field of view (WFOV), the afocal foreoptics 200 is bypassed using the bypass mirror 125 and the WFOV insert mirror 120. The bypassed electromagnetic radiation beam is received by the bypass mirror 125 which reflects the electromagnetic radiation beam towards the WFOV insert mirror 120. The WFOV insert mirror 120 in turn is arranged to reflect the electromagnetic radiation beam toward the derotation device 130. Therefore, in the NFOV configuration, the WFOV insert mirror 120 and the bypass mirror 125 are moved away from the path of the electromagnetic radiation beam allowing only the electromagnetic radiation beam output by the afocal foreoptics 200 to reach the derotation device 130, whereas in the WFOV configuration, the bypass mirror 120 and WFOV mirror 125 are positioned in the path of the electromagnetic radiation beam so that the electromagnetic radiation beam bypasses afocal foreoptics 200 to reach the derotation device 130.

As discussed above, the roll gimbal rotates around the roll axis and therefore, the on-gimbal components of the sensor system 100 rotate around the roll axis relative to the body-mounted components. The roll axis is parallel to the beam of electromagnetic radiation 104 output by the afocal foreoptics 200 or parallel to the beam of electromagnetic radiation reflected by the WFOV insert mirror 125 (in the WFOV configuration). Due to this rotation around the roll axis, the image from the far field object or scene is also rotated. In order to correct for the rotation of the image, the derotation device 130 is configured to counter-rotate so that the image output by the derotation device is in the same direction independent of the rotation of roll gimbal or the coelostat mirror 110. In one embodiment, the derotation device 130 is an optical prism. In other embodiments, the derotation device 130 may include reflective optical elements (e.g., mirrors) and can be, for example, an all-reflective derotation device. However, as it will be appreciated by those skilled in the art that other types of derotation devices can also be used. Furthermore, the derotation device 130 can be omitted, and the derotation function may be accomplished electronically or through image data processing. In other embodiments, the derotation device 130 may not be needed. For example, while the derotation function is used for the IRST function, advanced LADAR scanning, and standoff reconnaissance, the derotation function may not be needed or may be optional for targeting functions, ranging functions and designator operation.

The electromagnetic radiation beam output by the derotation device 130 is directed toward the beam steering mirror 142, which reflects the electromagnetic radiation beam towards the laser dichroic element 150. The laser dichroic element 150 is configured to transmit a portion of the electromagnetic radiation beam received from the beam steering mirror 142 towards the imager 300. As discussed further below, the laser dichroic mirror 150 is also configured to reflect a portion of the electromagnetic radiation beam received from the beam steering mirror 142 towards the beam steering mirrors 144 and 146 and into the laser module 155. In one embodiment, the imager 300 is a focal optical system configured to form a focal image on a detector (e.g., infrared focal plane array or IR FPA) 184 or detector (e.g., visible focal plane array or VIS FPA) 186, or both. In one embodiment, the imager 300 has a five-mirror anastigmat form, as discussed further below. In one example, the dichroic beam splitters 172 and 174 are used to direct the electromagnetic radiation beam output by the imager 300 towards either detector 184 or detector 186 depending upon the wavelength of the electromagnetic radiation. For example, if the electromagnetic radiation beam has both an infrared component and a visible component, the infrared portion of the electromagnetic radiation can be directed towards detector 184 while the visible portion of the electromagnetic radiation can be directed towards detector 186.

In a range finder mode, LADAR mode or targeting mode, the laser module 155 is used to output a laser beam for range finder, LADAR or target designation functions. The laser module 155 may output a laser beam of electromagnetic radiation (shown as a solid line in FIG. 1) of any desired wavelength including a beam in the infrared wavelength range. The laser beam output by the laser module 155 is reflected by beam steering mirrors 146 and 144, and directed toward the laser dichroic element 150. The laser dichroic element 150 reflects the laser beam toward the derotation device 130 which transmits the laser beam toward the afocal foreoptics 200. The laser beam exits the afocal foreoptics 200 and is directed towards the coelostat mirror 110, which in turn reflects the laser beam towards the intended object or target.

In one embodiment, in order to track the direction of the laser beam, the laser module 155 is also configured to emit an auto-alignment beam (shown as a dotted line in FIG. 1) that is precisely co-aligned in direction to the laser beam. The auto-alignment beam may have a different wavelength than the laser beam, and may have less intensity than the laser beam. Similar to the laser beam, the auto-alignment beam is reflected by the beam steering mirrors 146 and 144 towards the laser dichroic mirror 150. The laser dichroic element 150 is configured to transmit a portion of the auto-alignment beam when incident on one of the faces (front face) of the dichroic element. Therefore, in order to enable the laser dichroic element 150 to reflect the auto-alignment beam towards the imager 300 and still preserve the desired line of sight data indicative of the direction of the laser beam, a corner cube or prism 160 is used to reflect the auto-alignment beam back towards the back face of the laser dichroic mirror 150. The back face of the laser dichroic mirror 150 is configured to reflect a portion of the auto-alignment beam toward the imager 300. The imager 300 transmits the auto-alignment beam towards the beam splitter 172 which directs the auto-alignment beam towards the beam splitter 174. Beam splitter 172 is configured to reflect the auto-alignment beam and transmit the infrared electromagnetic radiation beam output by the imager 300. The beam splitter 174 is configured to transmit the auto-alignment beam towards the auto-alignment detector (e.g., auto-alignment FPA) 182 and reflect the visible electromagnetic radiation output by the imager 300 towards the detector 186. The auto-alignment detector 182 is used to detect the laser boresight direction relative to lines of sights of the detectors 184 and 186.

The auto-alignment beam is used to determine the line of sight (LOS) direction of the laser, i.e., to determine the direction in which the laser beam is pointing. By using the above described optical arrangement, the auto-alignment beam "follows" the laser beam regardless of the position of the beam steering mirrors 144 and 146 or the laser dichroic mirror 150. In other words, the laser beam and the auto-alignment beam have a common optical path from the laser module 155 through the imager 300. Therefore, when the laser beam is steered using beam steering mirrors 144 and 146 and/or laser dichroic mirror 150, the auto-alignment is also steered in the same manner, such that the auto-alignment beam (dotted line) and the laser beam (solid line) follow substantially the same path (as shown in FIG. 1).

However, with respect to the dichroic element 150, the laser beam is reflected by the front face of dichroic mirror 150 towards beam steering mirror 142 which in turn directs the laser beam towards the derotation device 130 while the auto-alignment beam is transmitted through dichroic mirror 150. Therefore, in order to reflect the auto-alignment off of the laser dichroic element 150, the corner cube or prism 160 is positioned in the path of the transmitted auto-alignment beam. As discussed above, the corner cube or prism 160 is configured and arranged to reflect the auto-alignment beam onto the back face of the laser dichroic mirror 150. The back face of laser dichroic mirror 150 is configured to reflect a portion of the auto-alignment beam towards the imager 300. By reflecting the auto-alignment on the back face of dichroic mirror 150 and reflecting the laser beam on the front face of the dichroic mirror 150, a rotation of the dichroic mirror 150 will affect the orientation of both the laser beam and the auto-alignment beam in a precisely similar manner. Therefore, the auto-alignment beam "tracks" the laser beam regardless of the position of beam steering mirrors 144 and 146 and the dichroic element 150. As a result, by determining the position of the auto-alignment beam using auto-alignment detector (e.g., A/A FPA) 182, the line of sight or boresight of the laser beam can be determined with considerable accuracy.

As discussed above, in one embodiment, the afocal foreoptics 200 is an all-reflective unfolded four-mirror anastigmat. In contrast, conventional airborne sensor systems, such as that disclosed in U.S. Pat. No. 8,759,735, for example, use a folded three-mirror anastigmat for the foreoptics design. The four-mirror anastigmat according to certain embodiments may provide several advantages over conventional systems. For example, the four-mirror anastigmat is capable of imaging a larger field of view with the same or better image quality, distortion and other optical characteristics. This is in part due to the larger number of design choices available (e.g., placement of mirrors within the optical train, shape, size, and/or optical power of the mirrors, etc.). U.S. Pat. No. 4,804,258 discloses a conventional four-mirror afocal optical system which is off axis in both aperture and field angle. In this conventional system, the secondary, tertiary and quaternary mirrors are tilted and decentered relative to the optical axis of the primary mirror to enhance image quality and to provide access to a real exit pupil. According to certain embodiments, the basic optical form disclosed in U.S. Pat. No. 4,804,258 has been highly modified in first-order parameters such as aperture, field of view, and magnification. Additionally, for functional and packaging reasons, mirror power distributions and physical locations in embodiments of the afocal foreoptics 200 are vastly different compared to similar elements in the system disclosed in U.S. Pat. No. 4,804,258. Furthermore, as is detailed in FIGS. 4A-C and discussed below, embodiments of the present invention employ advanced mirror surface descriptions that serve to enhance all measures of performance.

As also discussed above, according to one embodiment, the imager 300 includes an all-reflective five-mirror anastigmat, rather than the focal four-mirror anastigmat used in the sensor system of U.S. Pat. No. 8,759,735 and similar conventional systems. U.S. Pat. No. 6,902,282 discloses an example of a five-mirror, all-reflective, relayed optical system. The five-mirror anastigmat form is capable of imaging larger fields of view than is the four-mirror anastigmat, which is consistent with the larger field of view capabilities of the four-mirror afocal foreoptics used in embodiments of the system disclosed herein, and consistent with the objective of achieving greater field of view. Additionally, the five-mirror anastigmat is characterized by a lower imaged pupil magnification than is the four-mirror anastigmat, and this too is consistent with the objective of achieving greater field of view.

Figure 2A:
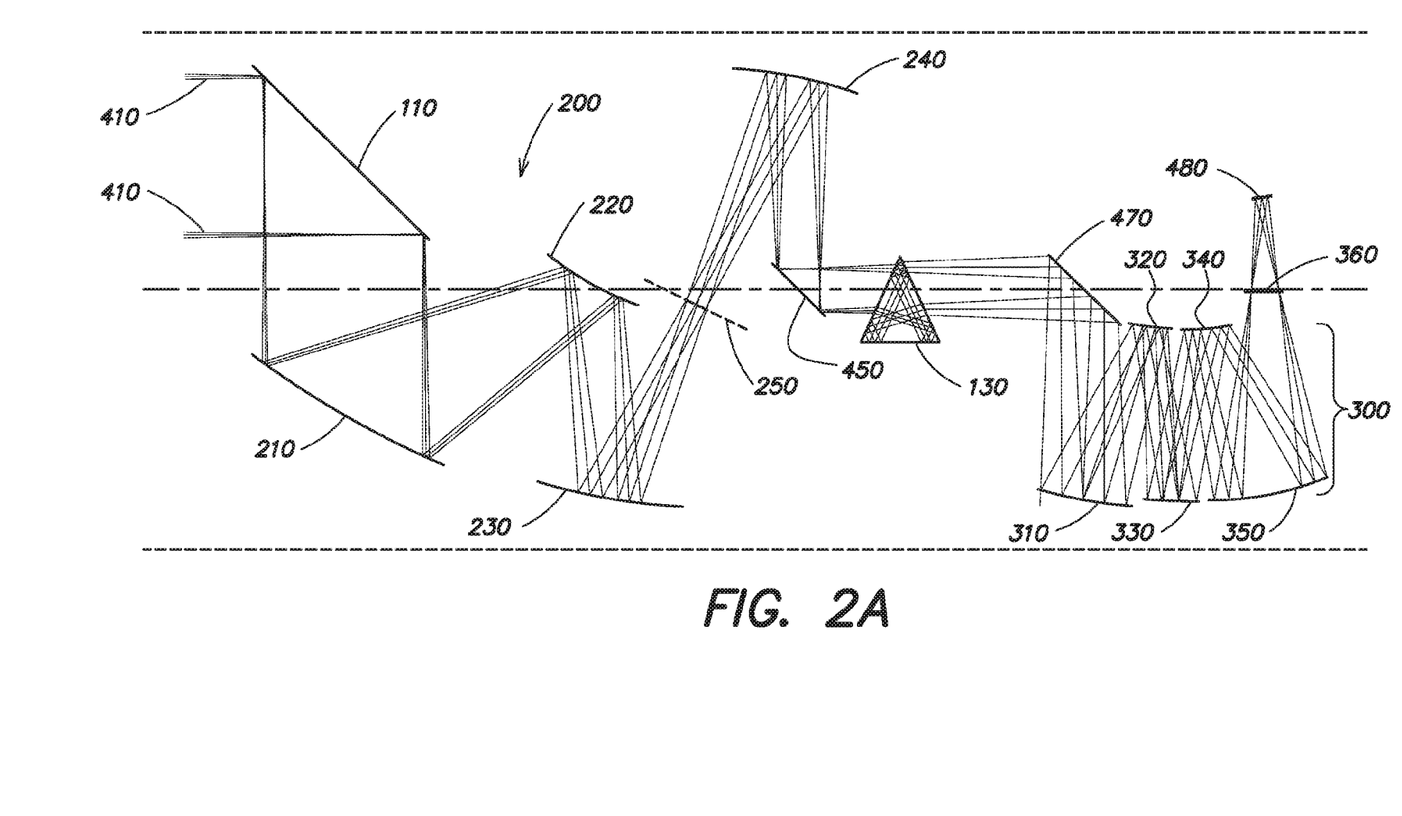
FIG. 2A is a ray trace section of one example the optics, including afocal foreoptics and focal imaging optics, for the sensor system of FIG. 1 corresponding to an orientation of the derotation device in which the narrow dimension of the focal plane array (FPA) imaging sensor is in the vertical plane and the wide FPA dimension is in the horizontal plane, according to aspects of the present invention.
Figure 2B:
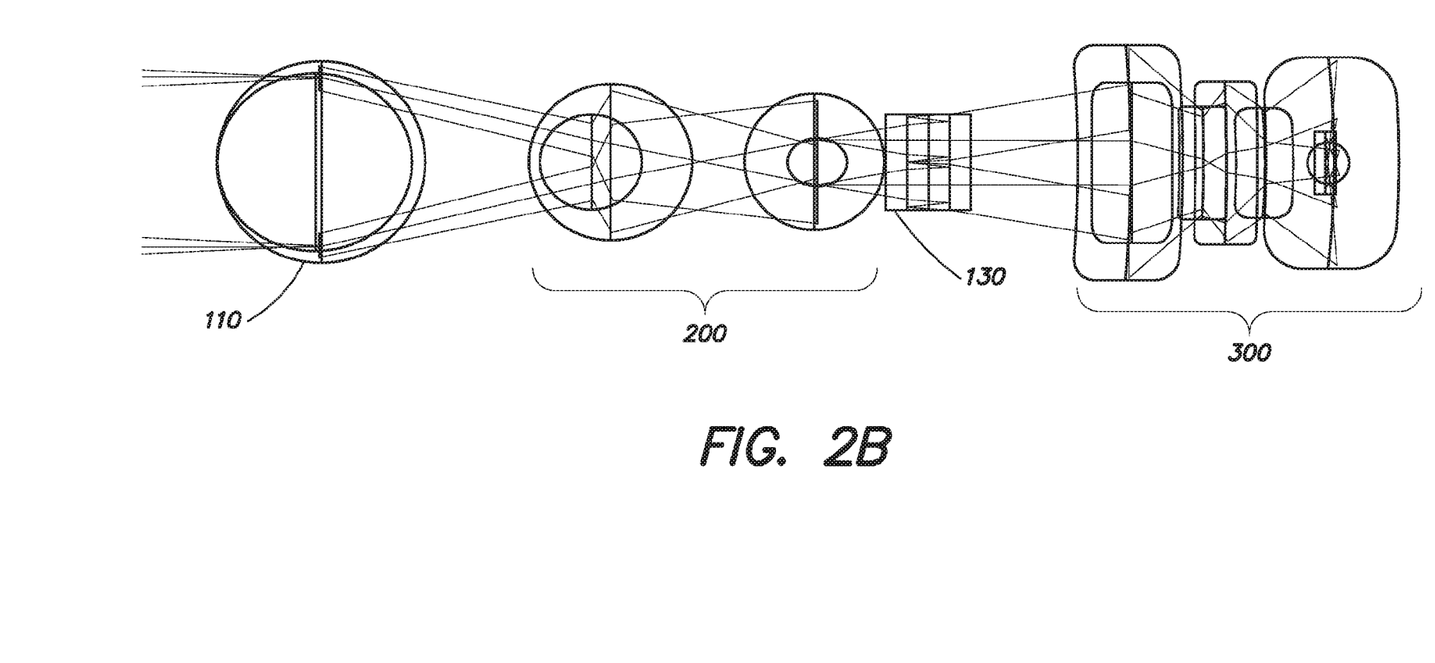
FIG. 2B is a top view of the ray trace section of FIG. 2A.
Figure 3A:
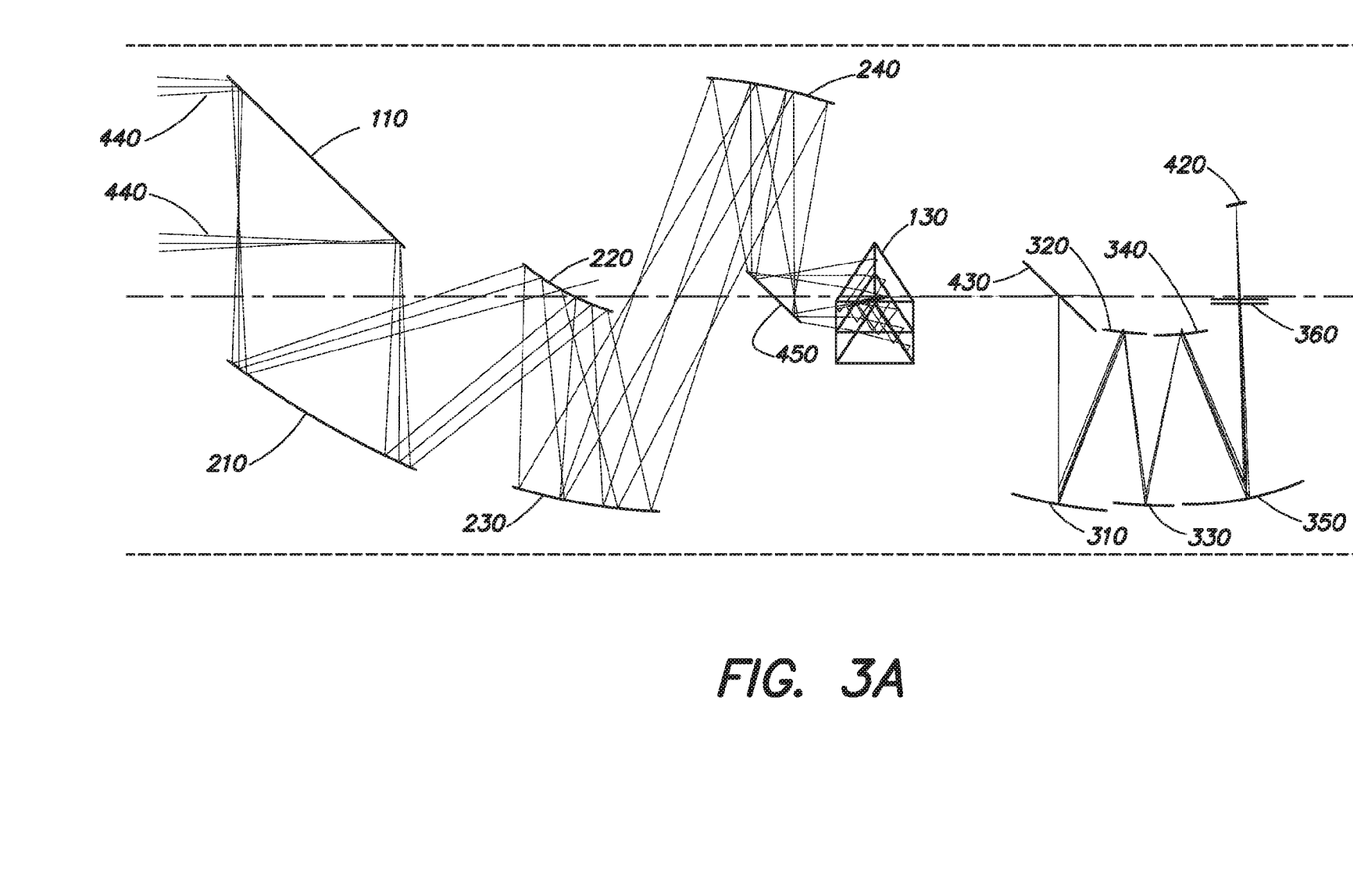
FIG. 3A is a ray trace section of the example the optics, including afocal foreoptics and focal imaging optics, for the sensor system of FIG. 1 corresponding to an orientation of the derotation device in which the narrow FPA dimension is in the horizontal plane and the wide FPA dimension is in the vertical plane, according to aspects of the present invention.
Figure 3B:
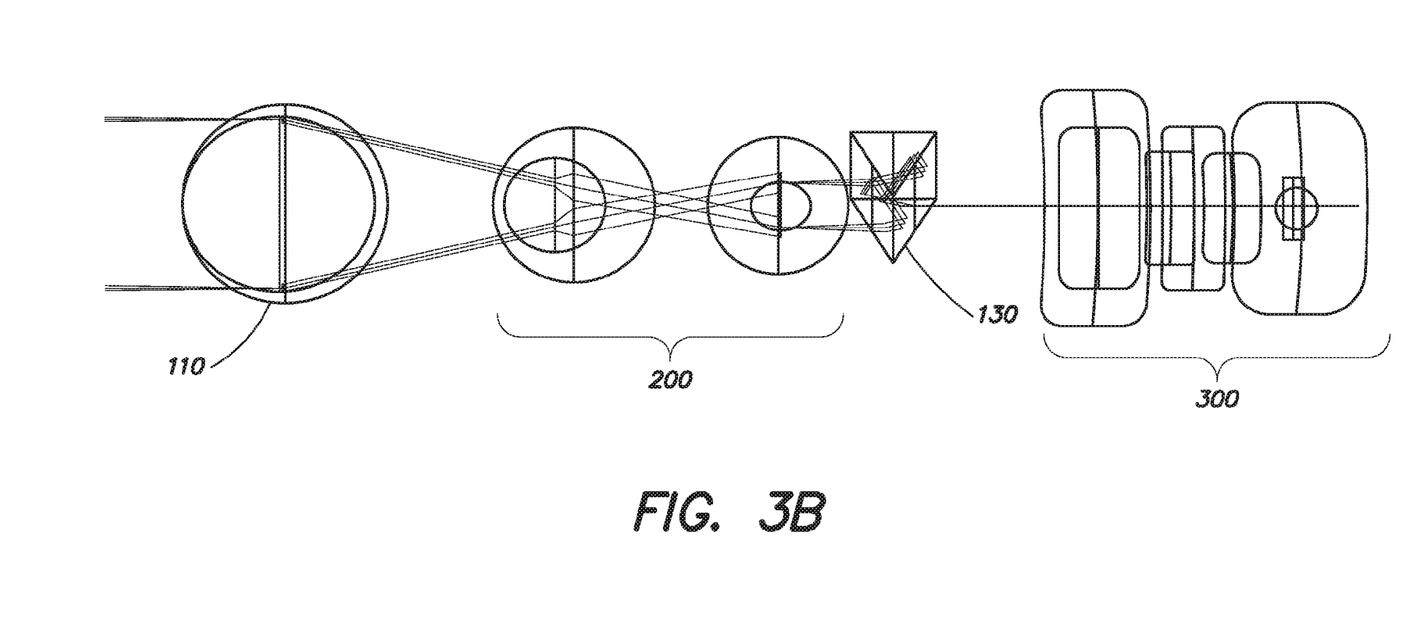
FIG. 3B is a top view of the ray trace section of FIG. 3A.

FIGS. 2A-B and 3A-B depict different views of a ray trace section of one example of the optics for a sensor system, such as sensor system 100, for example, including a four-mirror anastigmat to provide afocal foreoptics 200, and a five-mirror anastigmat to provide the focal relayed imager 300. The optics are assumed to relay the electromagnetic radiation onto 440 onto a focal plane array (e.g., detectors 182 and/or 184) having a rectangular aspect ratio (i.e., a narrow dimension and a wide dimension) in the image plane. FIG. 2A is a ray trace section showing the optics in a side view for an orientation of the derotation device 130 in which the narrow FPA dimension is in the vertical plane and the wide FPA dimension is in the horizontal plane. FIG. 2B corresponds to FIG. 2A, showing the optics viewed from above. FIG. 3A is a ray trace section showing the optics in a side view for an orientation of the derotation device 130 in which the wide FPA dimension is in the vertical plane and the narrow FPA dimension is in the horizontal plane. FIG. 3B corresponds to FIG. 3A, showing the optics viewed from above.

In the illustrated example, the afocal foreoptics 110 is a relayed, reimaging afocal four-mirror anastigmat including four non-spherical mirrors, namely, a primary mirror 210, a secondary mirror 220, a tertiary mirror 230, and a quaternary mirror 240. In one example, the afocal foreoptics is off-axis in aperture and offset in field of view angle relative to an optical axis defined by the primary mirror 210. Incident electromagnetic radiation 410 from a viewed scene is reflected onto the primary mirror 210 by the coelostat mirror 110. The primary mirror 210 in turn reflects the electromagnetic radiation 410 to the secondary mirror 220, which reflects the electromagnetic radiation to the tertiary mirror 230. The primary mirror 210, secondary mirror 220, and tertiary mirror 230 constitute an objective forming an intermediate image 250. The afocal foreoptics 200 thus has a reimaged optical form. In certain examples, a field stop may be located at the intermediate image 250. The intermediate image 250 is focused at infinity by the quaternary mirror 240, which directs a collimated beam of the electromagnetic radiation to a fold mirror 450 which is substantially coincident with the exit pupil of the afocal foreoptics. The fold mirror 450 reflects the electromagnetic radiation to the derotation device 130. Similarly, in reverse, the laser beam from the laser module 155 focused by the quaternary mirror 240 to form the intermediate image 250, and then collimated and directed by the tertiary, secondary, and primary mirrors 230, 220, 210, respectively, onto the coelostat mirror 110, and reflected from the coelostat mirror into the far field.

In one example, the primary mirror 210 is a conic ellipsoid mirror, the secondary mirror 220 is a conic hyperboloid mirror, the tertiary mirror 230 is a conic hyperboloid mirror, and the quaternary mirror 240 is a conic oblate spheroid mirror. In one example, the afocal foreoptics 200 has an optical magnification of about 3.75×. In the illustrated example, the primary mirror 210, tertiary mirror 230, and quaternary mirror 240 are positive powered mirrors, and the secondary mirror 220 is a negative powered mirror. The optical powers of the four mirrors may be balanced to provide a zero Petzval curvature or flat field condition. The secondary mirror 220, tertiary mirror 230, and/or quaternary mirror 240 may be tilted and/or decentered to improve the optical performance of the afocal foreoptics 200. Tilting and decentering may correct field aberrations, for example. Additionally, advanced mirror figure descriptions may be used on all of the afocal foreoptics mirrors. These advanced descriptions can include higher order aspheric departures that have rotational symmetry, as well as higher order aspheric departures that have only bi-lateral symmetry and can be specified by any one of a number of mathematical basis sets, among which the Zernike polynomials are often preferred.

As discussed above, in certain conventional four-mirror anastigmat optical systems, such as that disclosed in U.S. Pat. No. 4,804,258, for example, the primary mirror is arranged forward-facing and would therefore require an additional fold mirror to access the coelostat mirror 110 should one attempt to use such a system in the sensor system 100. In contrast, the four-mirror anastigmat of the afocal foreoptics 200 is uniquely arranged and packaged such that it is laterally facing, rather than forward facing. As a result, the afocal foreoptics 200 may interface directly with the coelostat mirror 110, as shown in FIGS. 2A-B and 3A-B, without requiring an additional fold mirror or any other reflective optical element to be placed between the primary mirror 210 and the coelostat mirror 110. Additionally, many conventional reimaged afocal foreoptics used in systems that include one or more laser functions require a vacuum cell or vacuum chamber to enclose the intermediate image 250 due to the field strength of the laser beam (determined, in part, by the laser power, pulse width and beamwidth) at the intermediate image. In contrary, in at least certain embodiments, the intermediate image quality produced by the four-mirror anastigmat of the afocal foreoptics 200 may be sufficiently poor so as to avoid the need for a vacuum cell.

Still referring to FIGS. 2A-B and 3A-B, the imager 300 is an all-reflective, relayed five-mirror anastigmat, including a first mirror 310, a second mirror 320, a third mirror 330, a fourth mirror 340, and a fifth mirror 350. Incoming electromagnetic radiation from the derotation device 130 and/or laser beamsplitter 150 (not shown in FIGS. 2A-B and 3A-B) are directed to the first mirror 310 of the imager via a stabilization mirror 430. The second mirror 320 receives and reflects the beam of electromagnetic radiation reflected from the first mirror 310. The first and second mirrors 310 and 320 cooperate to form an intermediate image 360 between the second and third mirrors, as shown. A field stop may be located at the intermediate image 360. The beam of electromagnetic radiation is reflected by the third mirror 330 onto the fourth mirror 340, which in turn reflects the beam onto the fifth mirror 350. The fifth mirror 350 reflects the beam of electromagnetic radiation toward an image plane 420 at which one or more imaging detectors may be placed, as discussed above. In one example, the first mirror 310 has positive optical power, the second mirror 320 has negative optical power, the third mirror 330 has positive optical power, the fourth mirror 340 has negative optical power, and the fifth mirror 350 has positive optical power. The optical powers of the five mirrors may be selected and balanced such that the Petzval sum of the optical powers is approximately zero at the image plane 420 (flat field condition).

Figure 4A:
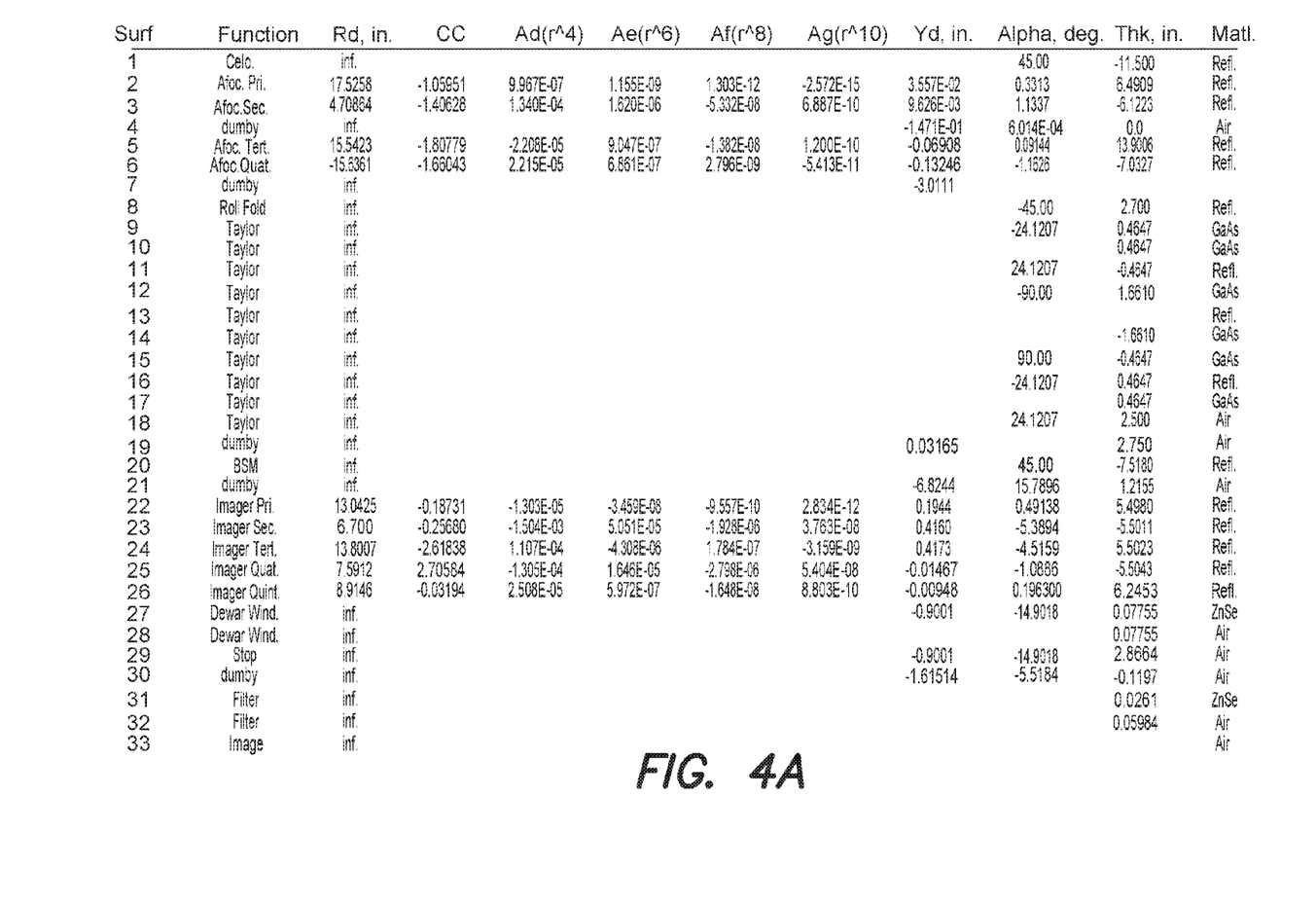
FIG. 4A is a table providing an example of an optical prescription for the optics illustrated in FIGS. 2A-B and 3A-B.
Figure 4B:
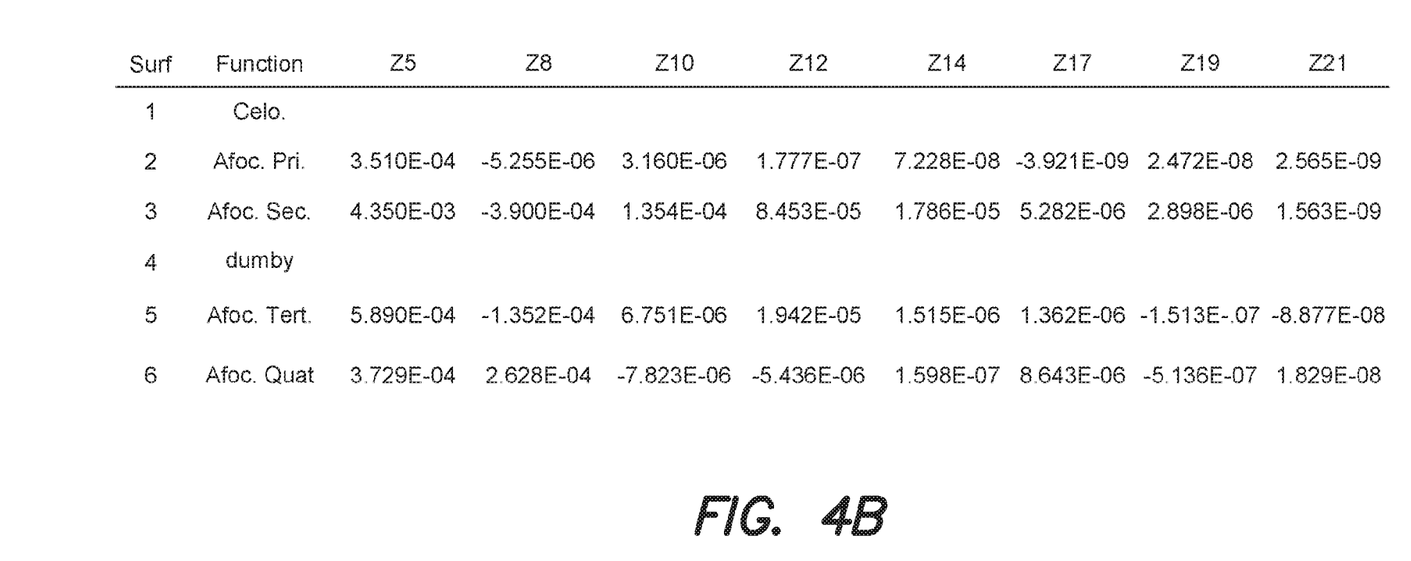
FIG. 4B is a table showing the Zernike terms corresponding to the optical prescription of FIG. 4A.
Figure 4C:
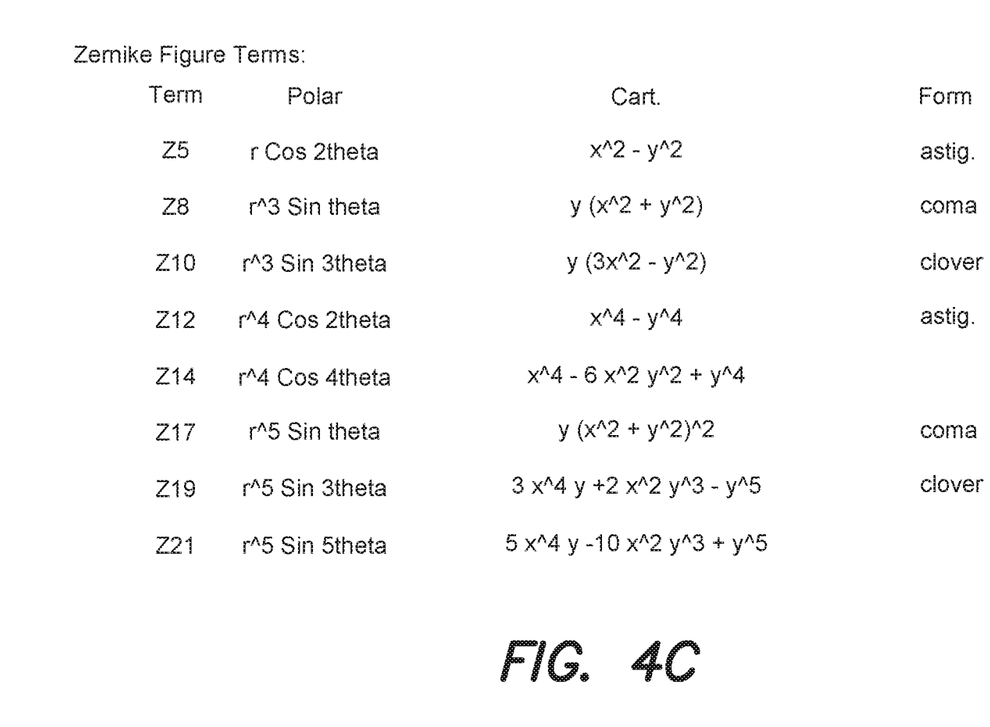
FIG. 4C is a table showing the Zernike figure terms used to calculate the Zernike terms provided in FIG. 4B.

The tables shown in FIGS. 4A and 4B provide an optical prescription for an example of the optical system illustrated in FIGS. 2A-B and 3A-B. The optical prescription for this example of the optical system may be generated using an equation which is an industry standard and which would be known to those skilled in the art. It is to be appreciated however, that the prescription given in FIGS. 4A and 4B is merely exemplary, and that the prescriptions of various embodiments of the optical system 100 are determined by the intended imaging task to be performed by the optical system.

The following system parameters correspond to the optical prescription provided in FIGS. 4A and 4B:
- Aperture: 5 inches
- Focal length: 17.8 inches
- Speed (F/#): F/3.58
- FPA FOV EL: 5.2 degrees
- FPA FOV AZ: 1.3 degrees
- Afocal magnification: 3.75×
- Afocal FOV: 5.6 degrees circular
- Imager aperture: 1.333 inches
- Imager focal length: 4.75 inches
- Imager FOV EL: 19.33 degrees
- Imager FOV AZ: 4.87 degrees In FIG. 4A, the third column provides the radius of the respective surface, measured in inches. The minus sign indicates that the center of curvature is to the left of the mirror surface. The column designated CC is the conic constant which is equal to the negative squared value of the eccentricity of a conic section (a planar cut through a double sheeted conic surface). The columns designated Ad, Ae, Af and Ag are the aspheric constants of the specific mirror surfaces. With respect to an xyz coordinate system, consider the optical axis as the z-axis, with the y-axis taken in the tangential plane and the x-axis taken in the sagittal plane. The column designated Yd is the decentering distance, measured in inches. The decentering is measured along the y axis, and represents a displacement of the vertex of the surface from the origin of the coordinate system. The column designated Alpha describes the tilt, measured in degrees. Each of the mirror surfaces may be formed as a surface of revolution, this being done by revolving a conic section about an axis. The Alpha column gives the tilt of this axis in the yz plane. A positive number of degrees of tilt represents a tilting in the counterclockwise direction with reference to the xyz coordinate system. The column designated "Thk" provides the thickness of the respective surface, measured in inches. The column designated "Matl" provides the material of the respective surface. The term "Refl." indicates a reflective material/surface.

FIG. 4B includes the Zernike polynomial coefficient terms for the relevant respective surfaces, corresponding to the prescription of FIG. 4A. As known to those skilled in the art, the Zernike polynomials are a sequence of polynomials that are both historically significant and very relevant in the description of optical surfaces and wavefront phase functions. The Zernike coefficient terms provided in FIG. 4B are calculated according to the term definitions, both polar and Cartesian, provided in FIG. 4C.

The combination of the four-mirror anastigmat in the afocal foreoptics 200 and the five-mirror anastigmat in the imager 300 provide significantly enhanced field of view in elevation, for example, approximately 5° or greater, over conventional systems, which as noted above are typically limited to 3° EL FOV or less. In addition, by using all-reflective optical assemblies for the afocal foreoptics 200 and the imager 300, chromatic aberrations or restrictions can be entirely eliminated. Also, by providing all-reflective optical assemblies, a common optical path can be provided for all passive function and active functions thus achieving desired boresight characteristics for both functions. In addition, by using all-reflective optical assemblies, first order thermal sensitivity can be minimized.

Embodiments of the sensor system 100 may be capable of providing IRST, targeting, and standoff reconnaissance sensing functions utilizing either linear 1-D detector arrays operating in a scanning mode, or 2-D (e.g., square, rectangular or circular) detector arrays operating in either staring or step-staring modes, or in any combination of these modes. In one embodiment, IRST type sensing may be accomplished by scanning a linear or rectangular (with relatively high aspect ratio) detector array. Scanning with a linear 1-D or extended 2-D focal plane array may require a smooth continuous motion of the line of sight (LOS) that is strictly maintained orthogonal to the long dimension of the linear array. This can be accomplished by a coordinated operation of the rotation axis of the coelostat mirror 110, the roll axis, the derotation device 330, and the beam steering mirror 142, for example, using control system 190. However in step-staring an extended 2-D focal plane array, the array line of sight should be fixed and still in inertial space during the frame integration time of each exposure, typically measured in milliseconds. Motion of beam steering mirror 142, or a similar device, can be used to momentarily cancel the scanning effects of motion of the coelostat mirror rotation axis, the roll axis, and the derotation device 330 for a small angle (measured in milliradians) and a relatively short period of time (e.g., few milliseconds). This operation of beam steering mirror 142, or a similar device, is commonly termed "back-scan," and the direction of the back-scan is held in constant orientation to the detector arrays because beam steering mirror 142 is between the derotation device 130 and passive radiation detectors (e.g., FPAs) 184 and 186. For certain applications where the continuous scan motion is very fast, and the frame integration time is relatively long, the back-scan angle can be somewhat large (e.g., many milliradians). For such situations, it may be advantageous to have two beam steering mirrors instead of a single mirror at the location of beam steering mirror 142. This is easily accommodated within the sensor system, and the operation of two beam steering mirrors can be used to decrease or eliminate beam walk or wander on the foreoptics primary mirror 210. This use of two beam steering mirrors for the elimination of beam wander on the foreoptics primary mirror is accomplished in the active laser path by the operation of beam steering mirrors 144 and 146.

In certain IRST applications, it may be desirable to scan the field of view of the detector array(s) over a field of regard of approximately 10° in elevation and 140°-150° or more in azimuth. As discussed above, conventional sensor systems are limited to only 2-3° EL FOV, meaning that approximately 3 or 4 or 5 "bars" or repetitions of the azimuth sweep of the scan are required to cover the full 10° of elevation. As discussed above, embodiments of the sensor system discussed herein are capable of providing approximately 5° EL FOV, or more. Thus, advantageously, the desired 10° elevation field of regard may be scanned in only 2 bars using embodiments of the sensor system. In certain applications, this provides a highly advantageous scan pattern, as the first 5° of elevation field of regard may be scanned left-to-right, for example, and the second 5° of elevation field of regard may be scanned right-to-left (or vice versa), providing a rapid scan of the entire elevation and azimuth field of regard without "gaps" to move the optics into different positions (e.g., to repeat two back-to-back left-to-right scans) and having an essentially constant or equal view time of each point within the total two-dimensional field of regard. This configuration and scan pattern may therefore be preferred over odd numbered bar scan patterns (e.g., 1 bar, 3 bars, or 5 bars, for example). In addition to providing capability for an advantageous scan pattern over conventional systems, the all-reflective nature of the optics of the sensor system of various embodiments disclosed herein may retain all the active and passive spectral functions of conventional all-reflective systems, along with high transmission, low internal thermal emissions, and low thermal sensitivity. In addition, as discussed above, embodiments of the optics may be configured to be packaged within the same volume used by existing sensor systems, and are therefore compatible with existing pod-mounted systems and applications, for example.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, it is to be appreciated that examples of specific implementations are provided herein for illustrative purposes only and are not intended to be limiting. The scope of the invention should be determined from proper construction of the appended claims, and their equivalents.

What is claimed is:

1. An optical sensor system comprising:
   afocal foreoptics configured to receive and collimate electromagnetic radiation to provide a collimated beam of electromagnetic radiation, the afocal foreoptics including an all-reflective, reimaging four-mirror anastigmat;
   an imaging detector;
   focal imaging optics positioned between the afocal foreoptics and the imaging detector and configured to receive the collimated beam of electromagnetic radiation from the afocal foreoptics and to focus the beam of electromagnetic radiation onto the imaging detector, the focal imaging optics including a reimaging five-mirror anastigmat, the afocal foreoptics being configured to rotate about a first axis relative to the focal imaging optics and the imaging detector; and
   a scanning coelostat mirror configured to direct the electromagnetic radiation to the afocal foreoptics and to sweep a field of view of the imaging detector over a field of regard larger than the field of view, the afocal foreoptics being positioned between the scanning coelostat mirror and the focal imaging optics, and the field of view being determined at least in part by a combination of the afocal foreoptics and the focal imaging optics and covering at least 5 degrees in elevation.

2. The optical sensor system of claim 1 wherein the four-mirror anastigmat of the afocal foreoptics includes:
   a primary mirror configured to receive and reflect the electromagnetic radiation from the coelostat mirror;
   a secondary mirror configured to receive and reflect the electromagnetic radiation from the primary mirror;
   a tertiary mirror configured to receive and reflect the electromagnetic radiation from the secondary mirror, the primary, secondary, and tertiary mirrors together constituting an objective that forms an intermediate image; and
   a quaternary mirror configured to refocus the intermediate image to infinity to produce the collimated beam of electromagnetic radiation, and to reflect the collimated beam of electromagnetic radiation toward the focal imaging optics.

3. The optical sensor system of claim 2 wherein the primary, secondary, tertiary, and quaternary mirrors are non-spherical mirrors.

4. The optical sensor system of claim 2 wherein the primary mirror is a conic ellipsoid mirror, the secondary mirror and the tertiary mirror are conic hyperboloid mirrors, and the quaternary mirror is a conic oblate spheroid mirror.

5. The optical sensor system of claim 2 wherein the primary mirror, the tertiary mirror, and the quaternary mirror each have positive optical power, and the secondary mirror has negative optical power.

6. The optical sensor system of claim 5 wherein optical powers of the primary, secondary, tertiary, and quaternary mirrors are balanced to provide a substantially zero Petzval curvature.

7. The optical sensor system of claim 2 wherein the afocal foreoptics is configured to directly receive the electromagnetic radiation from the coelostat mirror with there being no reflective optical element positioned in an optical path between the coelostat mirror and the primary mirror.

8. The optical sensor system of claim 2 wherein the afocal foreoptics has an optical magnification of approximately 3.75×.

9. The optical sensor system of claim 1 wherein the five-mirror anastigmat is configured to form an intermediate image between a second mirror and a third mirror of the five-mirror anastigmat.

10. The optical sensor system of claim 9 wherein a first mirror of the five-mirror anastigmat, the third mirror, and a fifth mirror of the five-mirror anastigmat have positive optical powers, and the second mirror and a fourth mirror of the five-mirror anastigmat have negative optical powers.

11. The optical sensor system of claim 10 wherein the optical powers of the first, second, third, fourth, and fifth mirrors are balanced to produce a substantially zero Petzval curvature at the imaging detector.

12. An optical sensor system comprising:
   a first optical sub-system including an imaging detector and focal imaging optics configured to receive a collimated beam of electromagnetic radiation and to focus the electromagnetic radiation toward the imaging detector, the focal imaging optics including an all-reflective reimaging five-mirror anastigmat; and
   a second optical sub-system configured to rotate about a first axis relative to the first optical sub-system, the second optical sub-system including afocal foreoptics configured to receive electromagnetic radiation and to direct the collimated beam of the electromagnetic radiation to the first optical sub-system, and a coelostat mirror configured to rotate about a second axis substantially perpendicular to the first axis and to receive and reflect the electromagnetic radiation toward the afocal foreoptics, the afocal foreoptics including an all-reflective, reimaging four-mirror anastigmat.

13. The optical sensor system of claim 12 wherein the first optical sub-system further includes a derotation device configured to receive the collimated beam of the electromagnetic radiation from the second optical sub-system and to transmit the electromagnetic radiation towards the focal imaging optics, the derotation device being configured to counter-rotate the collimated beam of the electromagnetic radiation so that an image output by the derotation device is in a same direction independent of a rotation of the coelostat mirror about the second axis and about the first axis.

14. The optical sensor system of claim 12 wherein the first optical sub-system further includes a laser module configured to emit a laser beam and an auto-alignment beam, the laser beam being directed towards the coelostat mirror via the afocal foreoptics.

15. The optical sensor system of claim 14 wherein the auto-alignment beam is used to determine a line of sight of the laser beam.

16. The optical sensor system of claim 12 wherein a combination of the afocal foreoptics and the focal imaging optics provide a field of view for the imaging detector that is at least 5 degrees in elevation.

17. The optical sensor system of claim 12 wherein the afocal foreoptics is configured to directly receive the electromagnetic radiation from the coelostat mirror with there being no reflective optical element positioned in an optical path between the coelostat mirror and the afocal foreoptics.

* * * * *